United States Patent [19]

Zettel et al.

[11] Patent Number: 4,975,970

[45] Date of Patent: Dec. 4, 1990

[54] IMAGE DISPLAY HAVING AUTOMATIC IMAGE ADJUSTMENT

[75] Inventors: Hubert A. Zettel; Crispian L. Sievenpiper, both of Waukesha, Wis.

[73] Assignee: General Electric Company, Milwaukee, Wis.

[21] Appl. No.: 336,605

[22] Filed: Apr. 7, 1989

Related U.S. Application Data

[63] Continuation of Ser. No. 27,377, Mar. 18, 1987, abandoned.

[51] Int. Cl.$^5$ .............................................. G06K 9/00
[52] U.S. Cl. ............................................. 382/6; 382/18; 382/51
[58] Field of Search ........................ 382/6, 18, 47, 51; 358/80; 364/414

[56] References Cited

U.S. PATENT DOCUMENTS

| | | | |
|---|---|---|---|
| 4,298,944 | 11/1981 | Stoub et al. | 382/6 |
| 4,496,968 | 1/1985 | Pugsley | 358/80 |
| 4,503,555 | 3/1985 | Brimhall, Jr. et al. | 382/6 |
| 4,598,419 | 7/1986 | Mignot et al. | 382/6 |
| 4,617,592 | 10/1986 | MacDonald | 358/80 |
| 4,636,845 | 1/1987 | Alkofer | 358/80 |
| 4,644,582 | 2/1987 | Morishita et al. | 382/6 |
| 4,688,175 | 8/1987 | Kaneko et al. | 364/414 |
| 4,742,556 | 5/1988 | Davis, Jr. et al. | 382/51 |

*Primary Examiner*—Leo H. Boudreau
*Attorney, Agent, or Firm*—Douglas E. Stoner; James O. Skarsten

[57] ABSTRACT

A graphical image display provides improved image presentation due to potential removal of background data which would otherwise degrade presentation of the region of interest and due to automatic adjustment of image brightness and contrast based on operator preference. Statistical analysis of the image data is employed. The invention is particularly useful in medical diagnostic imaging.

11 Claims, 3 Drawing Sheets

IMAGE DISPLAY HAVING AUTOMATIC IMAGE ADJUSTMENT

This application is a continuation of application Ser. No. 027,377, filed Mar. 18, 1987, now abandoned.

BACKGROUND OF THE INVENTION

The present invention relates in general to image displays and more specifically to apparatus for removing irrelevant background information and for adjusting image brightness and contrast according to statistical information of the image.

The various applications of video displays and of hard-copy presentation of images have increased as computer graphics capabilities have improved. In an interactive graphics system, a processor creates a display file according to instructions from an operator. In one common arrangement, a displayed image consists of a plurality of pixels arranged in columns and rows. The display file consists of a magnitude for each pixel. In displaying an image, the operator can specify certain image parameters, such as image brightness and/or contrast.

Adjustment of such parameters may be critical in many applications to best visualize certain aspects of the data in the image. For example, in medical diagnostic imaging modalities, such as x-ray, nuclear medicine, computed tomography (CT), and nuclear magnetic resonance (NMR), optimum brightness and contrast varies according to the objective or specific parameters of an imaging experiment, and according to operator preference.

It is typically inconvenient and time consuming to adjust each image in a series of images taken by an operator. In addition to presenting an image to the operator during an image experiment (usually on a cathode ray tube), it is often desired to transfer images to film or to other permanent record. However, inefficiency results if the operator is required to adjust each new image during a series of experiments and filming operations to best visualize the information being sought.

A further problem in presenting an optimum image on a graphics display relates to the significance of a background in the image in relation to the region of interest. For example, where a background exists, it may contribute noise to the image which interferes with presentation of the region of interest.

Accordingly, it is a principal object of the present invention to provide graphics apparatus having improved image presentation.

It is another object of the invention to provide consistent image presentation over a series of images.

It is a further object of the invention to reduce the impact of image background on presentation of the region of interest.

It is yet another object of the invention to improve operator efficiency in medical diagnostic imaging experiments.

SUMMARY OF THE INVENTION

These and other objects are achieved in an apparatus for displaying images from image data employing a preset image scale factor, the apparatus comprising display means, data means, setting means, computing means and scaling means. The display means displays the image. The data means supplies the image data. The setting means is coupled to the display means and to the data means for allowing an operator to modify chosen image characteristics of a first displayed image having arbitrary characteristics. The computing means is responsive to the setting means for finding the scale factor for applying to statistical attributes of the image data corresponding to the first displayed image in order to generate a modified image having the chosen characteristics. The scaling means is coupled to the computing means and to the data means for scaling the statistical attributes of the image data corresponding to subsequently displayed images by the scale factor.

In another aspect of the invention, a method is provided for adjusting brightness and contrast of displayed images constructed from image data including a plurality of pixel values for each respective image. The method comprises the steps of (1) displaying a first image corresponding to a portion of the image data with arbitrary initial brightness and contrast, (2) adjusting the appearance of the first displayed image to provide an operator-preferred image, (3) computing a brightness scale factor derived from the difference between the mean brightness of the preferred image and the mean brightness of the pixel values corresponding to the first image, (4) computing a contrast scale factor derived from the ratio of standard deviation from mean brightness in the preferred image to the standard deviation from mean brightness of the pixel values corresponding to the first image, and (5) changing the brightness and contrast of subsequently displayed images according to the brightness scale factor and the contrast scale factor.

BRIEF DESCRIPTION OF THE DRAWINGS

The novel features of the invention are set forth with particularity in the appended claims. The invention itself, as to organization and method of operation, together with further objects and advantages thereof, may best be understood by reference to the following detailed description in conjunction with the accompanying drawings in which:

DETAILED DESCRIPTION OF THE INVENTION

Figure 1:
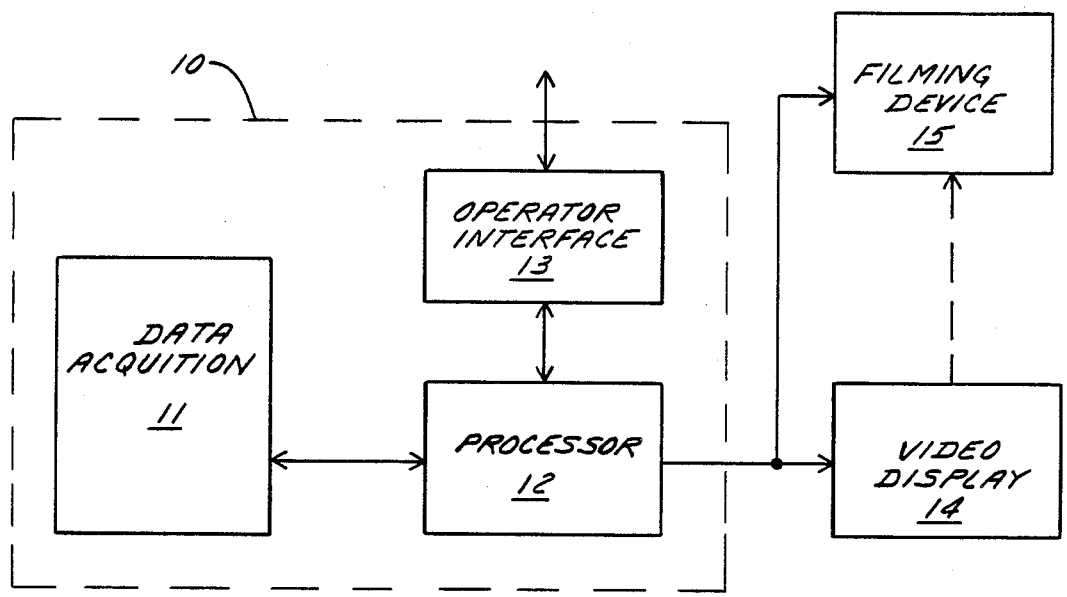
FIG. 1 is a block diagram of a graphics system suitable for practicing the present invention.

Turning now to FIG. 1, a graphics system 10 includes data acquisition apparatus 11 and a processor 12. An operator interface 13 is coupled to processor 12 to allow an operator to control the operation of system 10. Coupled to the output of processor 12 are a video display 14 and a filming device 15. In medical diagnostic applications, data acquisition apparatus 11 may comprise a well-known NMR apparatus or CT scanner. These systems provide information about an object which can be processed to form an image.

Video display 14 is preferably comprised of a cathode-ray tube (CRT) and associated electronics to display an image corresponding to an output signal from processor 12. Filming device 15 could be constructed to record images projected by video display 14 or alternatively could be constructed to produce hard-copy images directly from the output of processor 12 (e.g., a laser camera).

Figure 2:
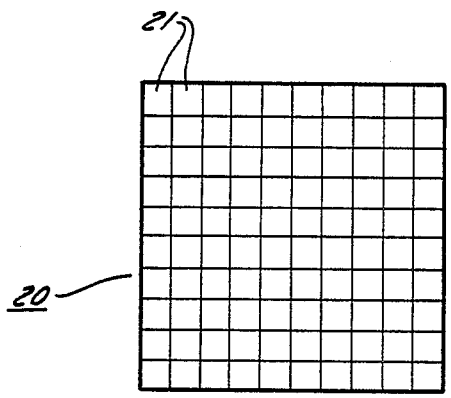
FIG. 2 is a diagram of a display having a plurality of pixels.

In a preferred embodiment of the invention, the images displayed by video display 14 and filming device 15 are comprised of a plurality of pixels 21 arranged in a matrix 20 having a plurality of rows and columns, as shown in FIG. 2. In response to data acquisition measurements from apparatus 11, processor 12 generates image data corresponding to an imaging experiment such that each pixel in the image has a magnitude associated with it. For example, in NMR imaging, each magnitude may represent a nuclei spin density in a particular volume which may be weighted according to a particular relaxation property of the nuclei. In CT, each magnitude may represent the X-ray attenuation of a particular part of a body.

The pixels of video display 14 or filming device 15 could produce an image with each pixel assuming a value directly proportional to these pixel magnitudes. However, better results are obtained when the operator conducting the experiment is allowed to adjust the characteristics of the displayed image so as to best visualize a structure of interest within the image. Medical diagnostic systems usually employ gray-scale (i.e., black and white) images, so that the adjustable characteristics of interest in those applications are brightness (i.e., level) and contrast (i.e., window or maximum deviation from level).

Another concern in presenting an image with optimum visualization of features within the image is the impact of background information surrounding the region of interest. For example, when the total field of view (FOV) of an image is greater than the expected region of interest within the image, pixel data corresponding to the background may have the effect of noise which can distort the image or reduce contrast in the region of interest.

Figure 3:
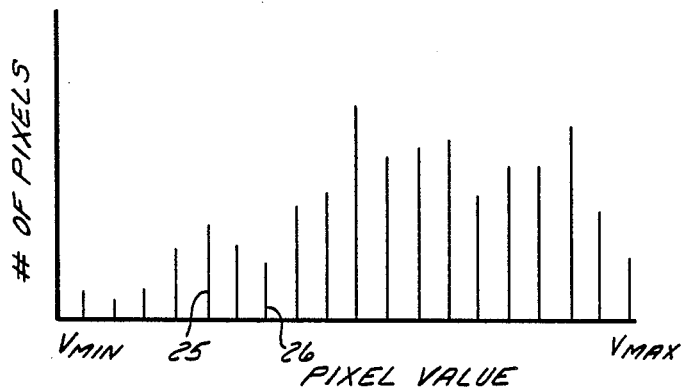
FIG. 3 is an example of a hisiogram of an image display file.

In one embodiment, the present invention achieves automatic setting of brightness and contrast according to an operator preference and reduces the effects of image background. In operation, the preferred embodiment employs an image pixel histogram, an example of which is shown in FIG. 3. The histogram in FIG. 3 graphically represents the total number of pixels in the image data for a particular image having each possible value of pixel magnitude (referred to as bins). Thus, for each pixel magnitude, there are a number of pixels with that magnitude, which can be plotted. The histogram can also be represented numerically. The use of an image pixel histogram facilitates automatic brightness and contrast approximation of operator preference and elimination of undesired background information as discussed below.

According to the invention, determination of image brightness and contrast are based on statistical analysis of image data. It is the use of pixel statistics that allows the operator to specify a preference in brightness and contrast for one image with subsequent images having their brightness and contrast automatically adjusted to approximate that preference.

Figure 4:
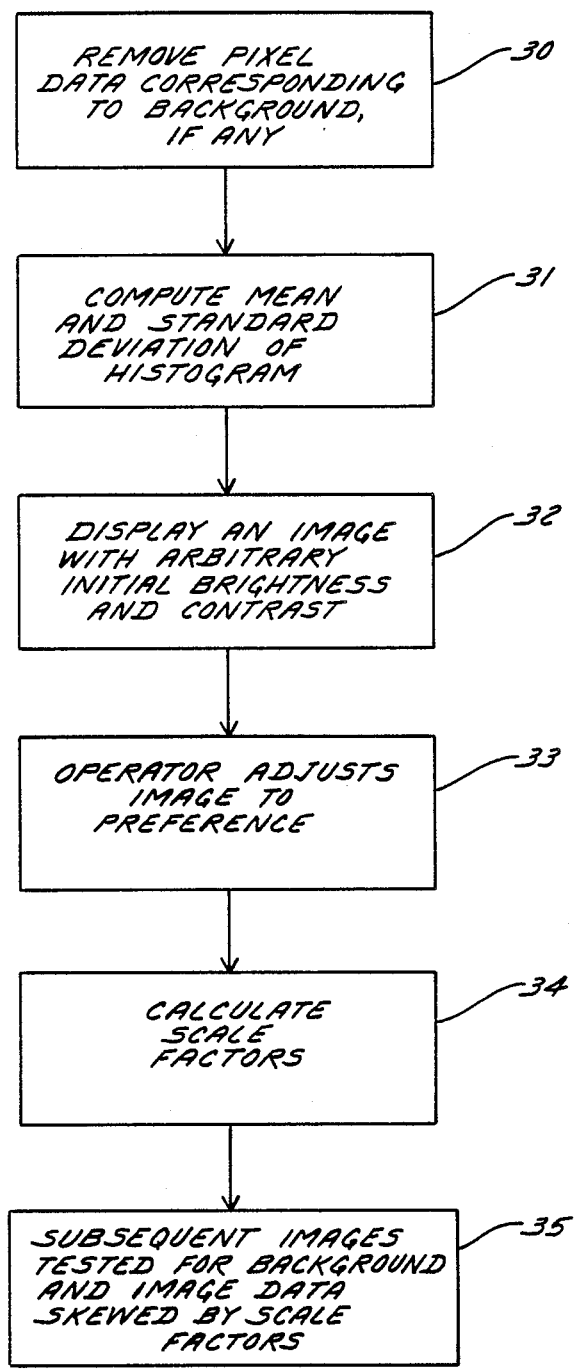
FIG. 4 is a block diagram illus(rating one embodiment of the method of the present invention.

A preferred me(hod of opera(ion will be described with reference to FIG. 4. In step 30, the method determines if any portion of the image can be considered as background (and hence ignored). The presence of background depends on the size of the region of interest relative to the total field of view of the image. In the present invention, it is assumed that background pixels are darker (i.e., have a smaller magnitude) than the region of interest. Thus, if an image is found to contain background, then image data corresponding to pixel magnitudes below some determined magnitude are deleted from the histogram and from the image.

Relative size of field of view and region of interest can be directly determined from operator input or can be determined from other information available to the graphics system. For example, in NMR imaging, it is known to use various radio-frequency (RF) coils in imaging different portions of the body (e.g., a whole-body coil, a head coil or an extremity coil). Each coil has a known total imaging volume. For comparison, the operator inputs his desired field of view (i.e., magnifica-(ion). In one exemplary NMR system, background removal is done when the field of view is (1) greater than or equal to 32 cm for a whole-body coil, (2) greater than or equal to 20 cm of a head coil, and (3) greater than or equal (o 12 cm for an extremity coil, since a larger field of view is more likely to include a background.

Pixel removal is done from the lowest bin in the histogram to the first valley in the histogram immediately following the first peak. In other words, given a bin L, first determine the lowest bin x' such that $L_{x-1} < L_x > L_{x+1}$ where $L_{x+1}$ is the number of pixels per bin. This peak corresponds to bin 25 in the example of FIG. 3. Next, find the smallest bin y following the peak such that $L_{y-2} > L_{y-1} > L_y < L_{y+1}$ Thus, in the preferred embodiment, $L_y$ must be decreasing for two consecutive bins in finding the valley. All of the pixels below bin y are then removed from the histogram.

In step 31 (FIG. 4), the mean value and standard deviation are calculated of the histogram of a first image to be displayed. In step 32, the first image is displayed with arbitrary initial brightness and contrast. The image brightness (i.e., level) is directly proportional to the pixel mean value and the displayed image standard deviation (i.e., contrast or window) is directly proportional to the calculated standard deviation.

In step 33, the operator adjusts the image to his preference. This is preferably done via operator interface 13 (FIG. 1). By changing the factor of proportionality (i.e., scaling) between displayed brightness and pixel mean and between displayed standard deviation and calculated standard deviation in response to operator commands, the image is adjusted.

Once the operator has decided upon a preferred image, scale factors are calculated in step 34. Let $\alpha$ be the window scaling factor and let $\beta$ be the level offset factor. Also let $\sigma$ be the standard deviation found in step 31. Then the factors are preferably defined by $\alpha = W_o/\sigma$ and $\beta = (L_o - L_a)/\sigma,$ where $W_o$ and $L_o$ are the window and level of the operator's preferred image and $L_a$ is the mean from step 31. Alternatively, $\beta$ could be defined as $L_o - L_a$.

In step 35, subsequent images displayed or recorded by the graphics system are first tested for potential background removal in the same manner as described above with reference to step 30. The resulting histogram is then used in presenting the subsequent image. The image data for the subsequent image is skewed according to $\alpha$ and $\beta$ to present an image having a brightness $L_d$ and a window $W_d$ such that $$W_d = \alpha \sigma' \text{ and}$$

$$L_d = L_a' + \beta(\sigma'),$$

where $\sigma'$ is the pixel standard deviation of the subsequent image's histogram, $L_a'$ is the histogram mean and $\beta(\sigma')$ equals $(L_o - L_a')/\sigma'$. Alternatively, $L_d$ could be defined as $L_a' + \beta$.

Figure 5:
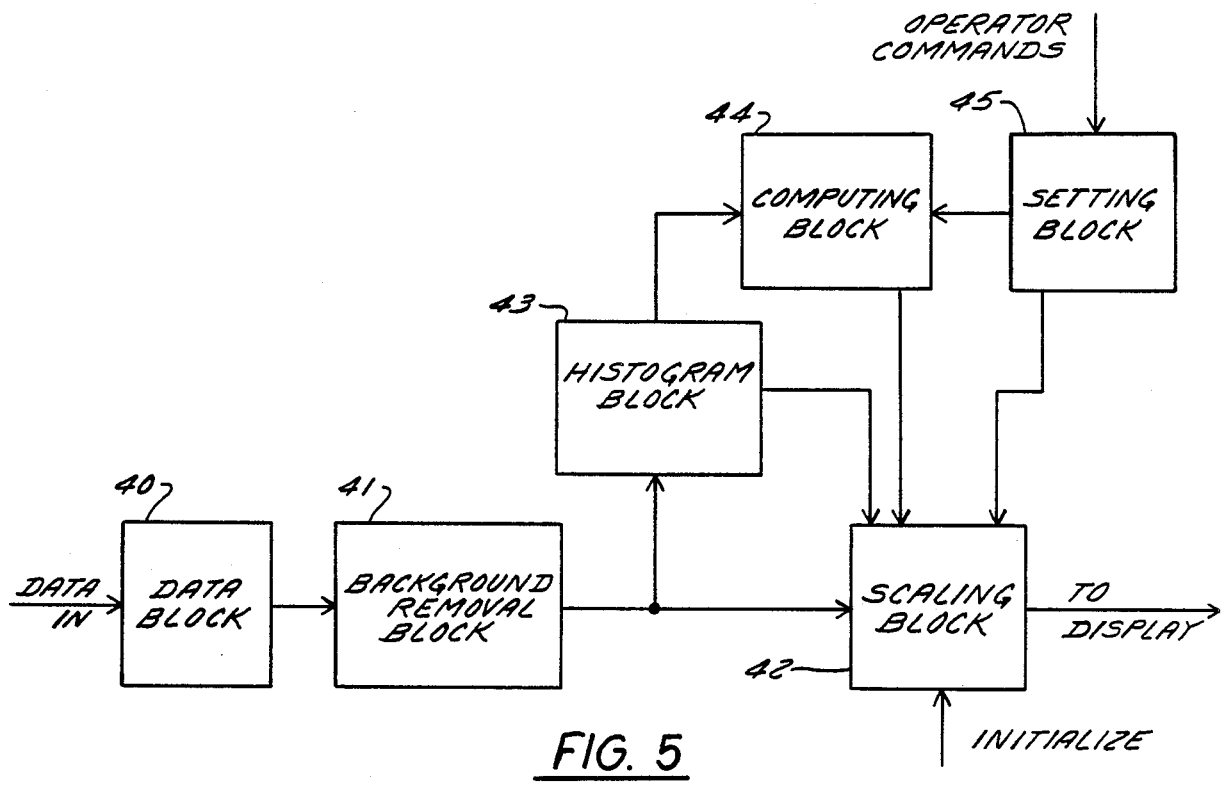
FIG. 5 is a block circuit diagram according to the present invention.

The method described above is well adapted to be implemented by software in a typical graphics system. FIG. 5 describes an implementation which can be taken to be either actual circuits in a hardware implementation or blocks or modules in a software implementation. A data block 40 receives image data such as pixel magnitudes, image histogram, size of region of interest and coil type (for NMR). Background removal block 41 deletes background pixel data as appropriate. A histogram, as modified by block 41, is stored in a histogram block 43.

A scaling block 42 receives image data and provides a scaled output for display. Scaling block 42 can be initialized to display a first image of selected arbitrary brightness and contrast.

A computing block 44 and a setting block 45 allow the operator to adjust the first image and cause subsequent images to approximate the operator's preference. Thus, setting block 45 receives commands from the operator to adjust the image produced by scaling block 42. Once a preferred image is obtained, computing block 44 derives the scale factors to be provided to scaling block 42 in processing subsequent images.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. Apparatus for displaying images from image data employing a preset image scale factor, comprising:
   display means for displaying an image;
   data means for supplying said image data;
   setting means coupled to said display means and to said data means for allowing an operator to modify chosen image characteristics of a first displayed image having arbitrary characteristics;
   computing means responsive to said setting means for finding said scale factor for applying to statistical attributes of image data corresponding to said first displayed image in order to generate a modified image having said chosen characteristics; and
   scaling means coupled to said computing means and to said data means for scaling said statistical attributes of image data corresponding to subsequently displayed images by said scale factor.

2. The apparatus of claim 1 further comprising histogram means coupled to said computing means and to said scaling means for storing a histogram of the image data corresponding to a respective image, said statistical attributes being derived from said histogram.

3. The apparatus of claim 1 employing two scale factors wherein said chosen display characteristics are brightness and contrast, said computing means finding a brightness scale factor proportional to the difference between the mean brightness of said modified image having said chosen characteristics and the mean brightness of said image data corresponding to said first displayed image, said computing means finding a contrast scale factor proportional to the ratio of mean brightness of pixels in said image having said chosen characteristics to the standard deviation from mean brightness of pixels in said image data corresponding to said first displayed image.

4. The apparatus of claim 2 further comprising background removal means coupled to said histogram means for selectably causing image data below a calculated level in said histogram to be ignored in displaying an image, said calculated value corresponding to the first valley immediately following the first peak in said histogram.

5. Apparatus for displaying medical diagnostic images from image data, comprising:
   display means for displaying an image;
   data means for supplying said image data, said image data including an image histogram and the field of view of said image; and
   background removal means coupled to said data means for causing image data below a calculated level in said histogram to be ignored in displaying an image if said field of view is below a predetermined size, and for otherwise using said data below said calculated level in displaying an image, said calculated level corresponding to the first valley immediately following the first peak in said histogram.

6. The apparatus of claim 5 wherein said image data includes results from NMR measurements, wherein said image data further includes an indication of the type of coil used in deriving said NMR measurements and wherein the predetermined size of field of view is dependent on the RF coil indicated.

7. A method for adjusting brightness and contrast of images constructed from image data including a plurality of pixel values for each respective image, said method comprising the steps of:
   displaying a first image corresponding to at least a portion of said image data with arbitrary initial brightness and contrast;
   adjusting the appearance of said first displayed image to provide an operator-preferred image;
   computing a brightness scale factor derived from the difference between the mean brightness of said preferred image and the mean brightness of the pixel values corresponding to said first image;
   computing a contrast scale factor derived from the ratio of mean brightness in said preferred image to the standard deviation from mean brightness of said pixel values corresponding to said first image; and
   changing the mean brightness and standard deviation of subsequently displayed images according to said brightness scale factor and said contrast scale factor.

8. The method of claim 7 further comprising the step of:
   providing a histogram of said image data corresponding to each respective image, said histogram representing the number of pixels of an image having each possible pixel value.

9. The method of claim 8 further comprising the step of:

deleting from said histogram data corresponding to pixel values below a level representing background portions of a respective image.

10. The method of claim 9 wherein said level is found by a method comprising the steps of:
   finding the lowest histogram bin value x such that the number of pixels in the histogram bin x, designated $L_x$, satisfies the relation $L_{x-1} < L_x > L_{x+1}$; and
   finding the first bin value y while increasing in said histogram from x such that the number of pixels in the histogram bin y, designated $L_y$, satisfies the relation $L_{y-2} L_{y-1} L_y L_{y+1}$, said level being equal to y.

11. A method for displaying medical diagnostic images constructed from image data corresponding to each respective image, said image data obtained from NMR measurements and including an indication of the type of RF coil used in obtaining said measurements, said image data further including a histogram and an indication of size of field of view corresponding to each image, said method comprising the steps of:
   determining whether said size of field of view is below a predetermined size dependent on said indicated RF coil; and
   deleting from said histogram data corresponding to pixels representing background portions of a respective image if said field of view is below said predetermined size.

* * * * *